Aug. 11, 1959 D. HODKIN 2,899,236
MOTOR VEHICLE CHASSIS AND SUSPENSION MEANS
Filed Nov. 26, 1957 2 Sheets-Sheet 1
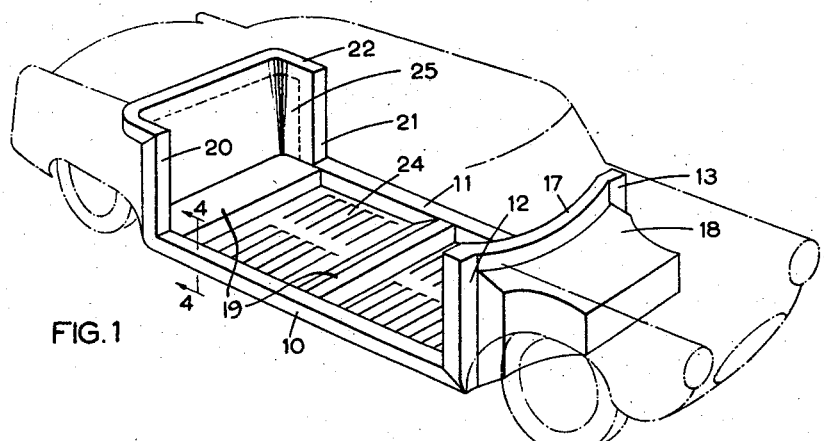
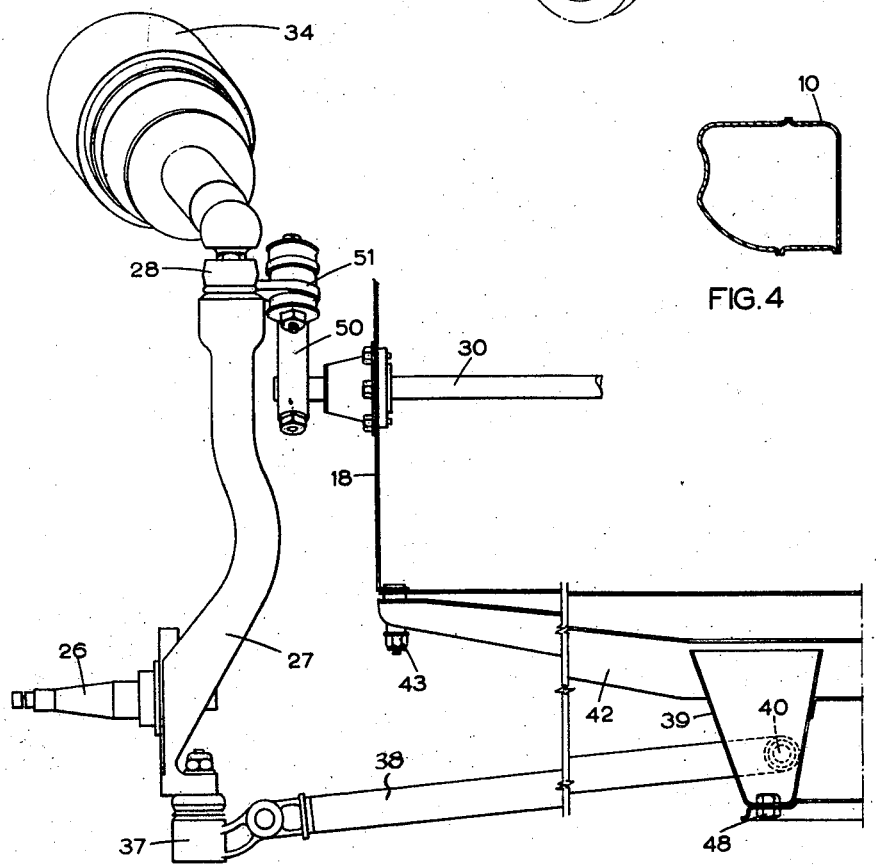
DAVID HODKIN
INVENTOR
BY Irwin S. Thompson
ATTORNEY

United States Patent Office 2,899,236
Patented Aug. 11, 1959

2,899,236

MOTOR VEHICLE CHASSIS AND SUSPENSION MEANS

David Hodkin, Dunstable, England, assignor to Engineering Research and Application Limited, a British company Application November 26, 1957, Serial No. 699,122

Claims priority, application Great Britain November 30, 1956

5 Claims. (Cl. 296—28)

This invention relates to motor-vehicles and its object is to provide a chassis with considerable stiffness against tendency to flex or vibrate under torsional and other loads.

According to the invention a motor-vehicle chassis is provided which comprises longitudinal side elements of closed hollow cross-section, two upstanding column members of hollow closed cross-section connected to the forward ends of the side members, and a cross-member of closed hollow cross-section connected to the upper ends of the two upstanding columns thereby forming an arch structure, and wheel suspension means mounted directly and/or indirectly on the hollow arch structure. This forward cross-member may be located above the level of the upper parts of the front wheels of the vehicle in order to leave the space between the columns and above the axis of the wheels free from suspension and steering devices, and serves not only to impart torsional stiffness to the chassis but also to carry the wheel suspension means and shock absorbers.

In a constructional form of the invention the side members, columns and front cross-members are box-girders of rectangular, e.g. square, cross-section made if desired from welded steel plate.

The rear ends of the side members may also carry upstanding box-girder columns that are connected together at their upper ends by a rear cross-member.

A constructional form of the invention will now be described by way of example with reference to the accompanying diagrammatic drawings wherein:

Figure 1 is a perspective view of a chassis made in accordance with the invention showing also the outline of the wheels and body;

Figure 3 is a half front view of part of the chassis and suspension means; and

Figure 4 is a cross-sectional view of a side member of the chassis.

Figure 2:
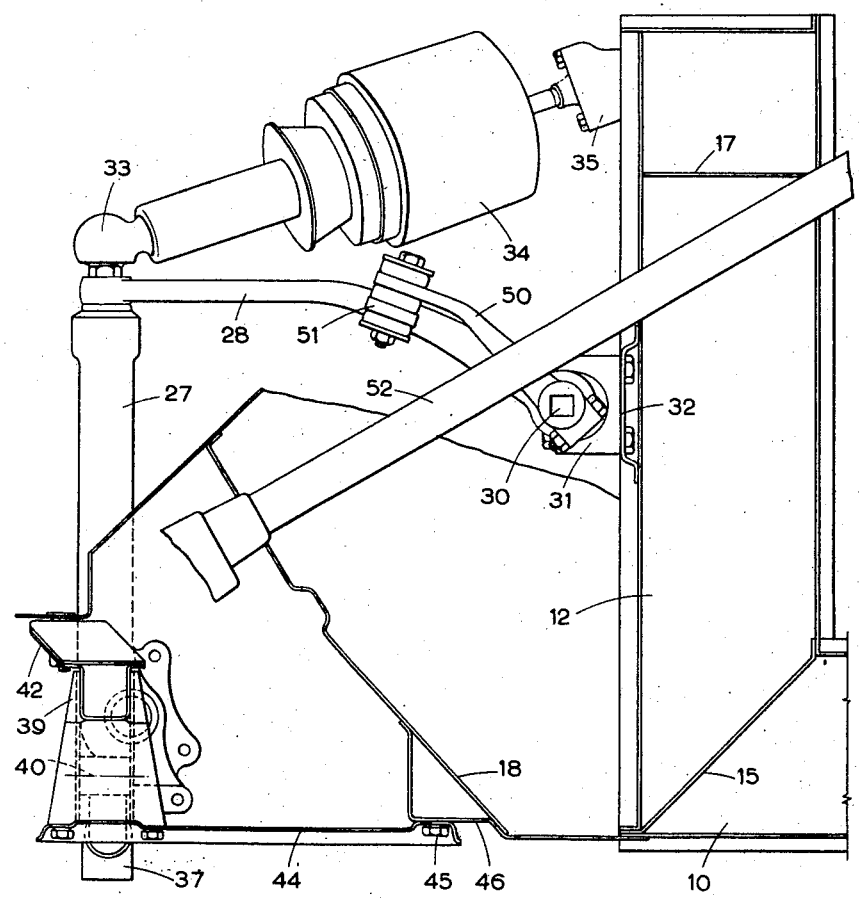
Figure 2 is a side view of the front part of the chassis showing the attachment thereto of wheel suspension means.

The chassis comprises two horizontal longitudinal side elements 10, 11 of closed hollow cross-section, e.g. square section or for example as shown in Figure 4 in which one side is shaped to match the doors. These side elements may be below the wheel axes and have their front ends located behind the front wheels and their rear ends located in front of the rear wheels. Two upstanding columns 12, 13 are welded to the front ends of the side elements 10, 11 and are also of closed hollow cross-section. A stiffener plate 15 is located across the joints of the columns 12, 13 to the elements 10, 11. A cross-member 17 of similar cross-section is welded across the upper ends of the columns 12, 13 to join them together rigidly and form an arch structure therewith, the cross-member being at a level above the upper parts of the wheels.

A box structure 18 is welded to the arch structure and extends forwardly thereof between the wheels and assists in stiffening the chassis. The structure 18 also provides space for the occupants' feet.

The side elements 10, 11 are connected together by cross-members 19 of closed cross-sectional shape and in the plane of said elements. Connected to the rear ends of the side elements are two rear upstanding columns 20, 21 of closed section connected together at their upper ends by a rearwardly bowed cross-member 22 of closed section. Sheet metal coverings 24, 25 and other parts may be attached to the chassis where required to enclose the chassis and to build up the body of the vehicle. The sheet 25 extends upwards at the rear of the chassis and covers the opening between the two rear columns 20, 21 up to the rear cross-member 22 to which it is attached by welding.

The front wheels are mounted on stub axles of which one is shown at 26 (Figure 3). Each stub axle is carried by a king post 27, the upper end of which is pivotally attached to the forward end of a link 28 which extends fore and aft of the vehicle and is mounted pivotally at 30 (Figure 2) on a bracket 31 fixed on a metal strip 32 that is welded one to the column 12 and the other to the column 13. The upper end of each post 27 is also pivoted at 33 to the forward end of a shock absorber 34 the rear end of which is mounted on a bracket 35 fixed to the column 12 (and 13). The lower end of the post 27 is connected pivotally by a member 37 to a rod 38 that extends laterally of the vehicle and is secured pivotally at 40 to one of a pair of brackets 39. These brackets are fixed at their upper ends to a transverse beam 42 that is bolted at its ends by bolts 43 to the box structure 18. An underneath supporting plate 44 is fixed by bolts 45 and brackets 46 to the structure 18 and at its forward end is fixed by bolts 48 to the lower ends of the brackets 39.

It will be seen therefore that the arch structure 11, 12, 17 forms a rigid support carrying the front wheel suspension and shock absorbers, both by a direct mounting as at 32 and by indirect mounting as at 18, 39.

The columns 12, 13 may form part of the vehicle door openings.

The pivot 30 is in the form of a stabiliser torsion bar connected at its ends by an arm 50 and links 51 to the links 28.

A steering column is shown at 52.

A vehicle body shown in chain lines in Figure 1 is mounted on the chassis and extends forwardly of the front wheels.

I claim:

1. A motor-vehicle comprising a chassis, said chassis including longitudinal side elements of closed hollow cross-section, two upstanding column members of hollow closed cross-section connected to the forward ends of the side members, and a cross-member of closed hollow cross-section connected to the upper ends of the two upstanding columns, said cross-member being localised at and near the plane of the upper ends of the columns so as to form an arch structure through which the driver's legs can project, and front wheel suspension means including king posts, suspension links connected at their forward ends to the king posts and connected at their rear ends to said columns respectively, a box structure connected to the arch structure and extending forwardly thereof and adapted to receive the driver's feet, a supporting device connected to one of said structures at the lower part thereof and extending forwardly and suspension links disposed transversely of the vehicle and having their inner ends mounted pivotally on said supporting device and their outer ends pivotally connected to the lower ends of the king posts respectively.

2. A motor-vehicle chassis as claimed in claim 1 wherein the cross-member connected to the two upstanding columns is bowed forwardly.

3. A motor-vehicle chassis as claimed in claim 1 wherein further two upstanding columns of hollow cross-section are provided connected to the rear ends of the side members, and a further cross-member connects these rear columns at their upper ends.

4. A motor-vehicle chassis as claimed in claim 3 wherein the cross-member connecting the upper ends of the two rear upstanding columns is located rearwardly of the columns except at its ends where it extends forwardly to connect with the columns.

5. A motor-vehicle chassis as claimed in claim 1 wherein the upstanding columns form part of a door opening.

References Cited in the file of this patent

FOREIGN PATENTS

| | | |
|---|---|---|
| 1,060,250 | France | Nov. 18, 1953 |
| 763,777 | Great Britain | Dec. 19, 1956 |
| 763,794 | Great Britain | Dec. 19, 1956 |